(12) United States Patent
Holmquist et al.

(10) Patent No.: US 6,788,096 B2
(45) Date of Patent: Sep. 7, 2004

(54) METHOD FOR MEASURING CURRENT IN A PULSE COUNT POSITIONING SYSTEM

(75) Inventors: Keith Holmquist, Winona, MN (US); Jim Dean, Minnesota City, MN (US); Larry Schmidt, Winona, MN (US)

(73) Assignee: Kelsey-Hayes Co., Livonia, MI (US)

( * ) Notice: Subject to any disclaimer, the term of this patent is extended or adjusted under 35 U.S.C. 154(b) by 91 days.

(21) Appl. No.: 10/122,945

(22) Filed: Apr. 12, 2002

(65) Prior Publication Data

US 2003/0193340 A1 Oct. 16, 2003

(51) Int. Cl.[7] .............................................. G01R 31/34
(52) U.S. Cl. ................................................... 324/772
(58) Field of Search .............................. 324/713, 716, 324/691, 76.39, 772

(56) References Cited

U.S. PATENT DOCUMENTS 5,514,977 A * 5/1996 Agiman ...................... 324/772
6,064,165 A * 5/2000 Boisvert et al. ............ 318/465
6,448,724 B1 * 9/2002 Kleinau et al. ............. 318/254

* cited by examiner

*Primary Examiner*—N. Le
*Assistant Examiner*—Amy He
(74) *Attorney, Agent, or Firm*—Harness, Dickey & Pierce

(57) ABSTRACT

A method of measuring current in a pulse count positioning system is provided, wherein various motor conditions such as back up due to cogging and/or gear train affects are taken into account in measuring current pulses that are correlated with the position of an electric device such as an automotive accessory. The method generally includes measuring current flow through an electric motor at regular intervals, summing the current flow at a second interval, storing the summed current flow as a current pulse occurs, starting a new sum of the current flow, and comparing sums for a previous two sums after a maximum timeout. Accordingly, the method according to the present invention takes various motor conditions into account for a more accurate measurement of current pulses, which correspond with the position of the electric device.

34 Claims, 3 Drawing Sheets

| Number | I-1 | I0 | Rule | Action | Description |
|---|---|---|---|---|---|
| 1 | E | C+D | I(0) < 0, I(0) =0, abs(I(0)) > 125%I(-1) | Pulse Count - 2 | P4 was seen by the detector and was in the reverse direction. P3 was detected |
| 2 | B | C+D+E | I(0) < 0 abs(I(0)) > 12.5% I(-1) | Pulse Count -1 | P4 is not detected, all other pulses in graph were detected. |
| 3 | B+C+D | E | I(0) < 0 abs(I(0)) > 12.5%I(-1) | Pulse Count -1 | P4 is detected but not P3 |
| 4 | A | B+C+D+E | I(0) > 0 same as 5 & 6 | none | both P4 and P3 are not detected |
| 5 | B | C | I(0) > 0 I(0) > 112.5% I(-1) | Pulse Count +1 | There is no P4 thus no back up, E & D are zero but the coast went past the commutation. |
| 6 | B | C | I(0) > 0 I(0) < 112.5% I(-1) | Pulse Count +1 | There is no P4 thus no back up, E & D are zero coast stopped before the next commutation. |

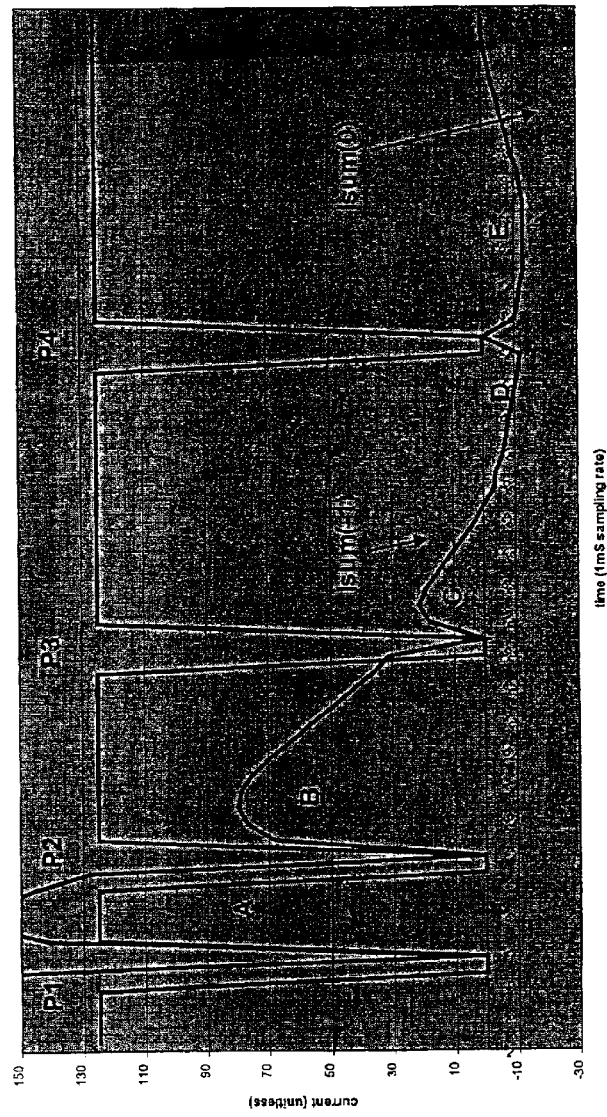

FIGURE 3

METHOD FOR MEASURING CURRENT IN A PULSE COUNT POSITIONING SYSTEM

FIELD OF THE INVENTION

The present invention relates generally to pulse count positioning systems and more particularly to a method of measuring current levels and pulses that correspond with positions of an electric device such as an automotive accessory.

BACKGROUND OF THE INVENTION

The position of electric devices such as motorized automotive accessories for climate control air handling, seat positioning, mirror positioning, and sunroof operation, among others, is generally controlled by an electric motor in communication with the electric device. Often, the position of the electric device must be known in order to facilitate certain features such as seat memory or safety functions such as stopping and/or reversing movement of a power sunroof when an obstruction is present. Methods of determining the position of the electric device include individual potentiometers mounted to the electric device that generate an electrical signal corresponding with position information, or more prevalently, pulse count positioning systems that count commutation pulses of the electric motor.

Pulse count positioning systems are well known in the art and generally determine the position of an electric device, e.g., automotive accessory, by counting the number of commutation pulses generated by the electric motor powering the device. As the electric motor rotates, current through motor windings is periodically interrupted as motor brushes rotate between poles of the motor. As a result, pulses or spikes in the current are produced, which are commonly referred to in the art as commutation pulses. Since the electric motor has a fixed number of poles, and each revolution of the motor causes the device to move a known distance, the position of the device may be correlated to the number of commutation pulses generated by the motor. Accordingly, the position of a device may be determined without the need for additional components such potentiometers or switches as previously implemented in the known art.

One such pulse count positioning system is disclosed in U.S. Pat. No. 5,497,326 to Berland et al., wherein a control system and method to move a motorized vehicle accessory a distance from a first position to a second position is disclosed. The control system comprises a controller that includes a routine for developing an adjustment factor, which modifies an output signal to correct for inaccuracies in detection as a result of memory drift over time. Additionally, commutation waveforms are analyzed to determine when an obstruction is present such that certain safety features of the system may be employed to stop the motor when an obstruction is detected. Unfortunately, the system of Berland does not filter pulses that result from a variety of motor conditions that include by way of example, motor backup due to cogging and/or gear train affects, in which pulses normally continue to be generated. Such pulses, when counted, contribute to errors in determining the position of the electric device or vehicle accessory.

Accordingly, there remains a need in the art for a method of measuring current in a pulse count positioning system that filters and analyzes commutation pulses based on a variety of motor conditions that include, for example, motor backup due to cogging and/or gear train affects.

SUMMARY OF THE INVENTION

In one preferred form, the present invention provides a method of measuring current in a pulse count positioning system, wherein current flow through an electric motor is measured at regular intervals, summed at intervals that correspond with the regular intervals, and stored as a pulse occurs. Once the measurements are stored, a new sum of the current flow is initiated. Further, current flows for a previous two sums are compared after a maximum timeout. Based on the comparison, the method of the present invention takes into account various motor conditions such as backup due to cogging and/or gear train affects, which may or may not cause a pulse to be detected, in arriving at a total current pulse count. Accordingly, various motor conditions are analyzed before arriving at the total current pulse count for a more accurate determination of the position of an electric device.

After the sums are initially compared, rules are employed to increase or decrease the pulse count by a value depending on the sum comparison, which correspond with various cogging force and/or gear train situations of the electric motor. Accordingly, the current sum between the previous two pulses is compared with the current sum when an actuator ceases using the maximum timeout as the detection for the end of an associated drive. The total current pulse count is then correlated with the position of an electric device or vehicle accessory, such as an air directing door in an automotive climate control system, in the preferred form of the present invention.

In another form, a system for measuring current is provided that comprises a signal processing system that receives current pulses from an electric motor, an A/D converter that measures the current pulses at regular intervals, a microcontroller that sums the current pulses at a second interval, a timer in communication with the microcontroller that sets time for the intervals, and a host microcontroller in communication with the microcontroller. Accordingly, the microcontroller transmits information to the host microcontroller on how an actuator for positioning a device should be positioned based on the current measurements.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a graph illustrating a cogging force and/or gear train affect backing up, with associated current pulses in accordance with the principles of the present invention.

DETAILED DESCRIPTION OF THE PREFERRED EMBODIMENT

The following description of the preferred embodiments is merely exemplary in nature and is in no way intended to limit the invention, its application, or uses.

Figure 1:
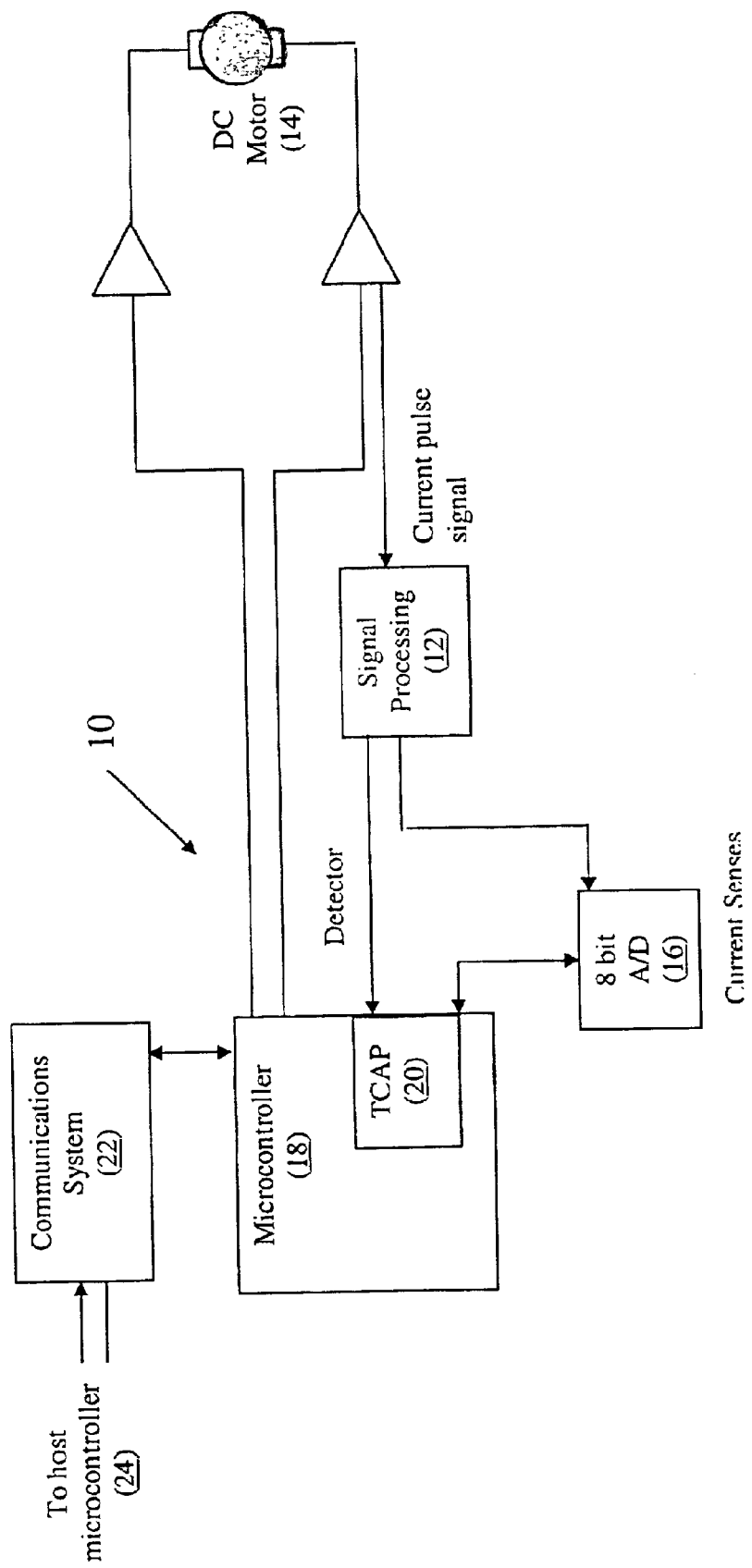
FIG. 1 is a block diagram schematic of a pulse count positioning system in accordance with the principles of the present invention.

Referring to the drawings, a pulse count positioning system in which the methods of the present invention are employed is illustrated and generally indicated by reference numeral 10 in FIG. 1. As shown, the pulse count position system 10 comprises a signal processing system 12 that receives a current pulse signal from a DC motor 14, an analog to digital (A/D) converter 16 that converts an analog current signal to a digital current signal and measures the current at regular intervals, a microcontroller 18 that receives the digital current signal and sums the current at the same interval as the A/D converter 16 or at least before the next interval occurs, and a timer 20 within the microcontroller 18 that is used to set a time for the regular intervals as described in greater detail below. As further shown, the microcontroller 18 is in communication with a communications system 22, which generally transmits information to the host microcontroller 24 on how an actuator for positioning a device should be positioned based on the current measurements.

Figure 2:
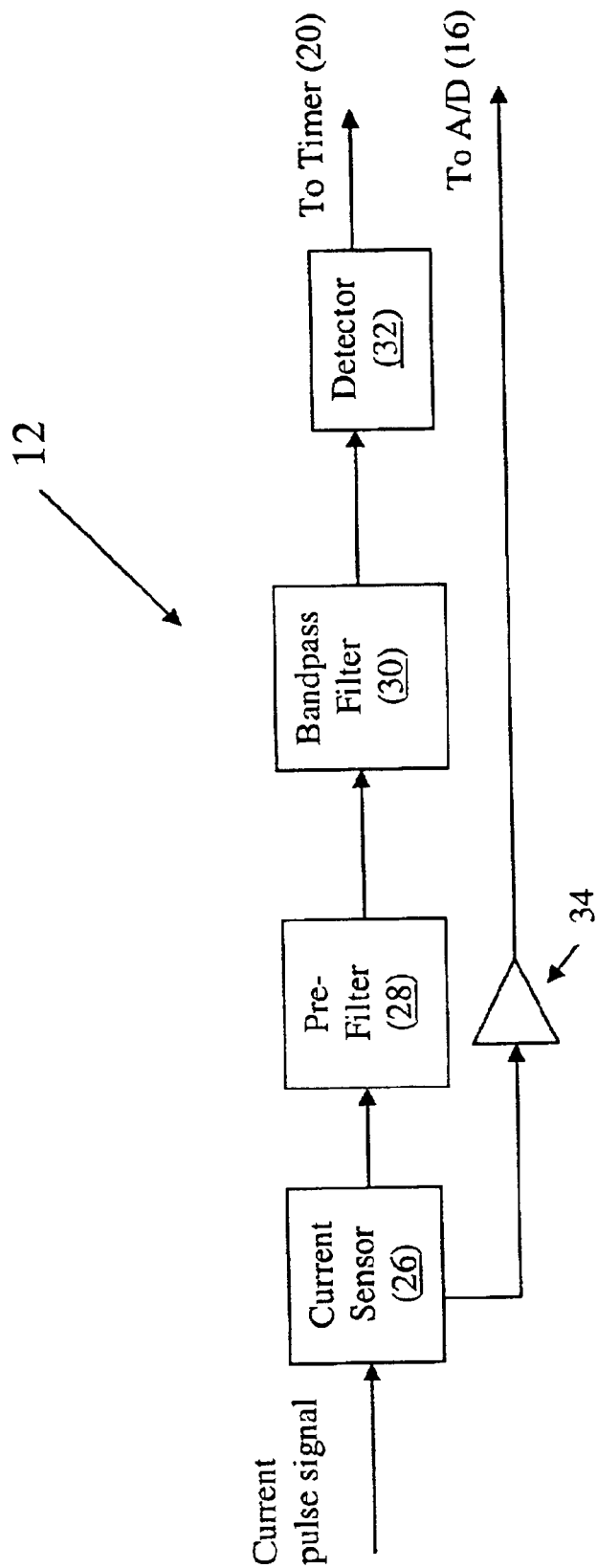
FIG. 2 is a block diagram schematic of a signal processing system in accordance with the principles of the present invention.

As further shown, the microcontroller 18 is in communication with the DC motor 14 such that the DC motor 14 may be controlled based on the current measurement and processing methods in accordance with the present invention. Accordingly, the signal processing system 12, as illustrated in greater detail in FIG. 2, further comprises a current sensor 26, a pre-filter 28, a bandpass filter 30, and a detector 32, through which the current pulse signal is processed and transmitted to the timer 20 within the microcontroller 18. Further, the signal processing system 12 comprises an amplifier 34, through which the current pulse signal is transmitted to the A/D converter 16, which is preferably 8-bit in one form of the present invention.

Generally, the pre-filter 28 and the bandpass filter 30 filter the current pulse signal received from the DC motor 14 to filter out noise or other low frequency signals that are not representative of a current pulse. Accordingly, the detector 32 receives a more accurate current pulse for transmission to the timer 20. Similarly, the amplifier 34 filters the current pulse signal such that the A/D converter 16 receives a more accurate current pulse.

In operation, current flowing through the DC motor 14 is measured at a regular interval by the A/D converter 16. Preferably, the regular interval is approximately every 1 millisecond in one form of the present invention which controls certain accessories for climate control air handling. The measured current is then summed by the microcontroller 18, wherein the summing is executed at a second interval that corresponds to the regular interval. Generally, the second interval is less than or equal to the regular interval. Accordingly, the second interval for summing the current is approximately every 1 millisecond in one form of the present invention. Additionally, during the current measuring operations within the A/D converter 16, a zero value established at a start-up is used as a zero current value prior to initiating another current measurement.

As each current pulse occurs, the sum is stored within the microcontroller 18 and a new sum is initiated, wherein only the present sum and the previous sum are stored within the microcontroller 18. Further, after a maximum timeout is reached, a comparison of the previous two sums is performed by the microcontroller 18, wherein rules are invoked to increase, leave unchanged, or decrease the pulse count. In one form of the present invention, the rules are applied in a total of six (6) conditions of the DC motor 14, which represent various cogging force and/or gear train affect situations as described in greater detail below. Additionally, an average of several intervals may be used rather than storing the present and previous sums, among other possible summing methods. Accordingly, storing the present and previous sums should not be construed as limiting the scope of the present invention.

Referring now to FIG. 3, the six (6) conditions of the DC motor 14 are illustrated, along with the rules for counting pulses. The value Isum(0) represents the current sum when an actuator stops using the maximum timeout as a detection for the end of an associated drive. The value Isum(−1) represents the current sum between the previous two pulses. For example, when Isum(0) is less than zero, equal to zero, or when the absolute value of Isum(0) is greater than approximately 125 percent of Isum(−1), the pulse count is decreased by two (2), which corresponds with the pulse P4 being in the reverse direction and pulse P3 being detected. The remaining motor conditions and corresponding rules are shown in further detail in FIG. 3.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A method of measuring current in a pulse count positioning system, the method comprising the steps of:
    (a) measuring current flow through a motor at regular intervals;
    (b) summing the current flow at intervals that correspond with the regular intervals;
    (c) storing the summed current flow as a current pulse occurs;
    (d) starting a new sum of the current flow; and
    (e) comparing the sums for a previous two sums after a maximum timeout,
    wherein rules are invoked to adjust a pulse count based on motor conditions.

2. The method of claim 1, wherein a zero current value established at a start-up is used in summing the current flow.

3. The method of claim 1, wherein when the sum of the current flow after the maximum timeout is less than zero, equal to zero, or an absolute value thereof is greater than approximately 125 percent of the current sum between the previous two pulses, the pulse count is decreased by two.

4. The method of claim 1, wherein when the sum of the current flow after the maximum timeout is less than zero or an absolute value thereof is greater than approximately 12.5 percent of the current sum between the previous two pulses, the pulse count is decreased by one.

5. The method of claim 1, wherein when the sum of the current flow after the maximum timeout is greater than zero, the pulse count remains unchanged.

6. The method of claim 1, wherein when the sum of the current flow after the maximum timeout is greater than zero or an absolute value thereof is greater than approximately 112.5 percent of the current sum between the previous two pulses, the pulse count is increased by one.

7. The method of claim 1, wherein the regular intervals are approximately one millisecond.

8. The method of claim 1, wherein the intervals in step (b) are approximately one millisecond.

9. A method of measuring current in a pulse count positioning system, the method comprising the steps of:
    (a) measuring current flow at regular intervals;
    (b) summing the current flow at intervals that correspond with the regular intervals;

(c) storing the summed current flow as a current pulse occurs;

(d) starting a new sum of the current flow; and (e) comparing the sums for a previous two sums after a maximum timeout, wherein a position of an electric device is determined based on the current pulses.

10. The method of claim 9, wherein the electric device is an automotive accessory.

11. The method of claim 9, wherein a zero current value established at a start-up is used in summing the current flow.

12. The method of claim 9, wherein the regular intervals are approximately one millisecond.

13. The method of claim 9, wherein the intervals in step (b) are approximately one millisecond.

14. A method of measuring a position of an automotive accessory, the method comprising the steps of:

(a) measuring current flow through an electric motor at regular intervals;

(b) summing the current flow at intervals that correspond with the regular intervals;

(c) storing the summed current flow as a current pulse occurs;

(d) starting a new sum of the current flow; and (e) comparing the sums for a previous two sums after a maximum timeout, wherein the position of the automotive accessory is determined based on the current measurements.

15. The method of claim 14, wherein a zero current value established at a start-up is used in summing the current flow.

16. The method of claim 14, wherein the regular intervals are approximately one millisecond.

17. The method of claim 14, wherein the intervals in step (b) are approximately one millisecond.

18. The method of claim 14, wherein the automotive accessory is an air directing door in a climate control system.

19. A method of measuring a position of an electric device, the method comprising the steps of:

(a) measuring current flow through an electric motor at regular intervals;

(b) summing the current flow at intervals that correspond with the regular intervals;

(c) storing the summed current flow as a current pulse occurs;

(d) starting a new sum of the current flow; and (e) comparing the sums for a previous two sums after a maximum timeout, wherein the position of the electric device is determined based on the current measurements.

20. The method of claim 19, wherein a zero current value established at a start-up is used in summing the current flow.

21. The method of claim 19, wherein the electric device is an automotive accessory.

22. The method of claim 21, wherein the automotive accessory is an air directing door in a climate control system.

23. The method of claim 19, wherein the regular intervals are approximately one millisecond.

24. The method of claim 19, wherein the intervals in step (b) are approximately one millisecond.

25. A method of measuring current in an electric motor, the method comprising the steps of:

(a) measuring current flow through a motor at regular intervals;

(b) summing the current flow at intervals that correspond with the regular intervals;

(c) storing the summed current flow as a current pulse occurs;

(d) starting a new sum of the current flow; and (e) comparing the sums for a previous two sums after a maximum timeout, wherein motor conditions are analyzed for the current measurements to determine a position of an electric device.

26. The method of claim 25, wherein a zero current value established at a start-up is used in summing the current flow.

27. The method of claim 25, wherein when the sum of the current flow after the maximum timeout is less than zero, equal to zero, or an absolute value thereof is greater than approximately 125 percent of the current sum between the previous two pulses, the pulse count is decreased by two.

28. The method of claim 25, wherein when the sum of the current flow after the maximum timeout is less than zero or an absolute value thereof is greater than approximately 12.5 percent of the current sum between the previous two pulses, the pulse count is decreased by one.

29. The method of claim 25, wherein when the sum of the current flow after the maximum timeout is greater than zero, the pulse count remains unchanged.

30. The method of claim 25, wherein when the sum of the current flow after the maximum timeout is greater than zero or an absolute value thereof is greater than approximately 112.5 percent of the current sum between the previous two pulses, the pulse count is increased by one.

31. The method of claim 25, wherein the current is summed using an A/D routine.

32. The method of claim 25, wherein the regular intervals are approximately one millisecond.

33. The method of claim 25, wherein the intervals in step (b) are approximately one millisecond.

34. A system for measuring current, the system comprising:

a signal processing system that receives current pulses from an electric motor;

an A/D converter that measures the current pulses at regular intervals;

a microcontroller that sums the current pulses at a second interval;

a timer in communication with the microcontroller that sets time for the intervals; and a host microcontroller in communication with the microcontroller, wherein the microcontroller transmits information to the host microcontroller on how an actuator for positioning a device should be positioned based on the current measurements.

* * * * *